United States Patent Office 3,280,846
Patented Oct. 25, 1966

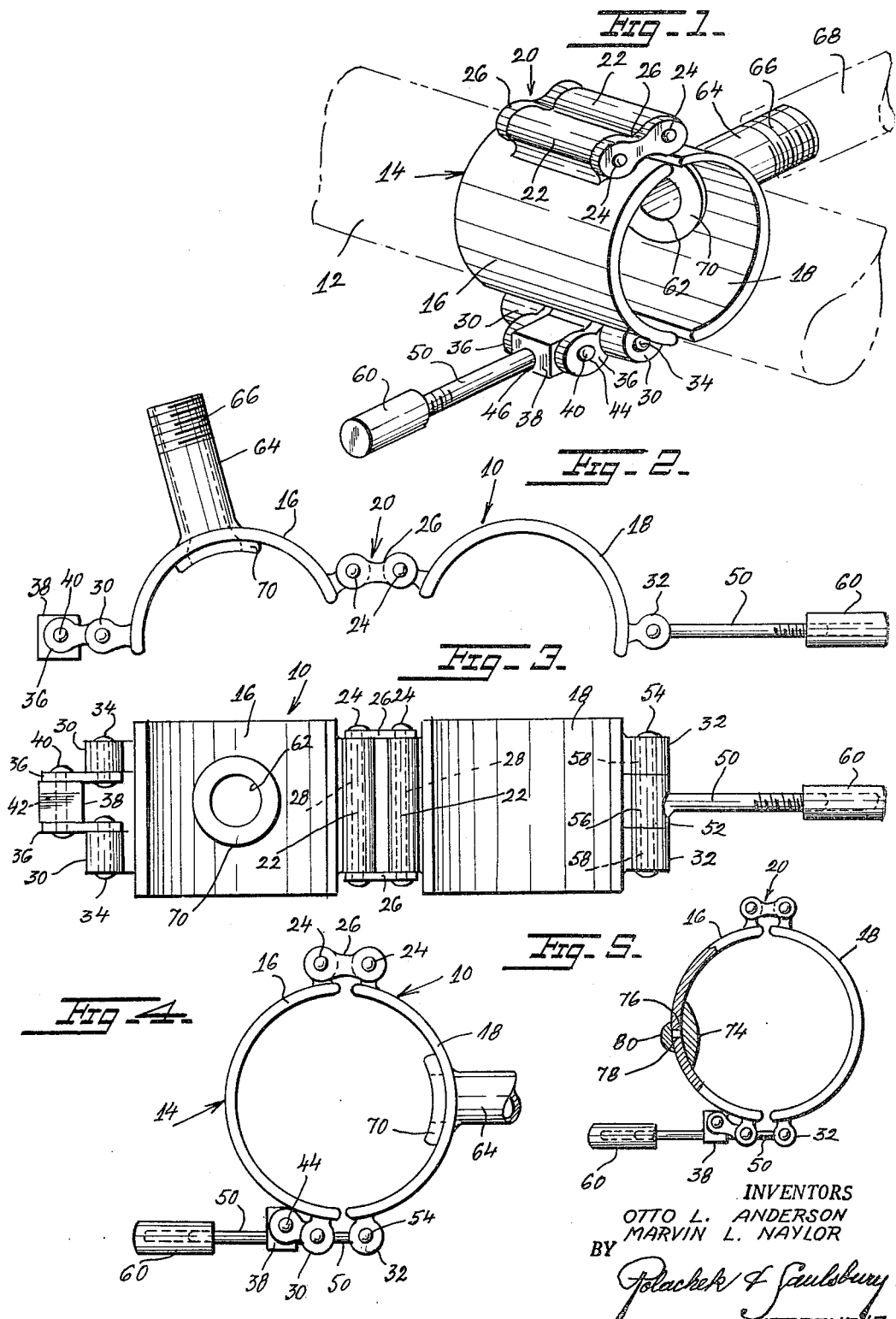

3,280,846
WATER AND CORPORATION CLAMP
Otto L. Anderson, 354 South 11 East, and Marvin L.
Naylor, Box 42, both of Springville, Utah
Filed Aug. 31, 1964, Ser. No. 393,232
2 Claims. (Cl. 138—99)

This invention relates generally to connectors and more particularly to a clamp for carrying and connecting a branch line pipe to a main line pipe.

The present invention is especially designed to afford a better, a quicker and more convenient way of connecting a branch pipe line to a main pipe line.

An important object of the invention is to provide a clamp which may be quickly applied to pipes or conduits having small clearance around them for connecting a branch pipe thereto.

Another object is to provide a flexible sectional metal band having toggle linkage attachable to the adjacent ends of the sections and a moulded rubber gasket attachable to its inner surface for application to a main pipe having an outlet opening and drawing said other ends of the band sections tightly toward each other and locking the latter ends in position.

A further object according to a modification of the invention is to provide a clamp which may be quickly applied to pipes or conduits to promptly and completely stop a leak therein while permanent repairs are being prepared.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a clamp embodying one form of the invention in operative position on a pipe, the pipe being shown in dash lines.

FIG. 2 is an end elevational view of the clamp shown in open extended condition.

FIG. 3 is a plan view thereof.

FIG. 4 is an end elevational view of the clamp shown in closed condition.

FIG. 5 is a view similar to FIG. 4 of a clamp embodying a modified form of the invention, parts being broken away.

Referring now to the drawing more in detail, in FIG. 1 a clamp 10 embodying one form of the invention is shown encircled around a main line water pipe 12, in operative position thereon.

The clamp 10 comprises a sectional elongated round band 14 including a pair of semi-circular sections 16 and 18 joined together along their adjacent end edges by a toggle connection indicated generally at 20. This connection includes elongated tubular bearings 22 cast integrally across the sections adjacent their meeting end edges in parallelism. Pivot pins 24, 24 extend through the tubular bearings and outwardly of the ends thereof and the outwardly protruding ends are connected by end plates 26, 26 formed with holes 28, 28 in which said pin ends are journalled.

A pair of spaced short tubular bearing members 30, 30 is cast integrally with the other end edge of section 16 therealong at the ends thereof, projecting slightly outwardly thereof, and a similar pair of spaced tubular bearing members 32, 32 are formed integrally with the other end edge of section 18. Pivot pins 34, 34 extend through the bearing members 30, 30 and a pair of plates 36, 36 are connected at one end to the projecting ends of pins 34, 34 and projected outwardly of the bearing members 30, 30 in spaced relation. A square shaped block 38 is interposed in the space between the outer ends of the plates 36, 36 and is secured to said outer ends by means of a pin 40 extending through a central passage 42 in the block and through holes 44 in the outer ends of the plates. The block 38 is formed with a narrow recess 46 extending from end to end thereof at its center intersecting one surface thereof, the bottom surface as viewed in FIG. 1, the recess 46 constituting a socket carried by section 16.

The section 18 carries an elongated round metal handle 50 having an enlarged head at one end thereof constituted by a tubular bearing member 52 adapted to fit in the space between the bearing members 32 on section 18 and secured in position by a pin 54 extending through the central passage 56 in the bearing member 52 and through passages 58, 58 in the bearing members 32, 32. The other end of the handle 50 is externally screw threaded to adjustably mount an elongated internally screw threaded knob 60.

In accordance with the invention, the section 18 is formed with an outlet opening 62 in the center of the wall thereof which is cast formed integrally on the outer surface of the wall of the section 18 where there is a short pipe 64 with its inner end communicating with the outlet opening 62. The outer end of the pipe is externally screw threaded as indicated at 66 to receive the threaded end of a branch pipe 68. A gasket 70 is suitably secured to the inner surface of the section 18 around the outlet opening 62 therein.

In operation, a clamp 10 is clamped around the main water pipe such as the pipe 12 shown in FIG. 1 having an outlet opening therein. The clamp is positioned so that the outlet opening 62 of the section 18 thereof is in register with the outlet opening in the main pipe 12, with the gasket 70 around said main pipe outlet opening. The handle 50 is swung across the clamp and its shank portion interlocked with the recess 46 in the block 38 and held therein by frictionally engaging the walls of the recess, thereby holding the clamp in locked operative position with its branch pipe 66 ready to receive water from the main line pipe, and feed it to the branch water pipe 68.

Referring now to the modification of the invention shown in FIG. 5, herein the clamp 10' constitutes a plug for sealing a leak while more permanent repairs are being prepared. The clamp 10' differs from clamp 10 merely in that the section 18 has no outlet opening and no branch pipe, but the section 16 carries means for sealing a leak in a main water pipe. This means includes a circular rubber plug 74 mounted on the inner surface of the section 16 at approximately its center. The mounting of the plug includes a neck portion 76 formed on the surface of the plug body at its center extending through a hole 78 in the wall of the section 16 at its center and an enlarged integral head 80 formed on the neck portion on the outside of the wall for holding the plug against displacement.

In use when a leak is discovered, it is only necessary to provide a clearance around the pipe large enough to pass the clamp therearound and properly locate the plug 74 over the leak. The sections of the clamp are then clamped by means of the handle 50 interlocking with the block 38 thereby providing an immediate and complete stoppage of the leak.

While we have illustrated and described the preferred embodiments of our invention, it is to be understood that we do not limit ourselves to the precise constructions herein disclosed and that various changes and modifications may be made within the scope of the invention as defined in the appended claims.

What we claim as new and desire to secure by Letters Patent is:

1. A device of the kind described comprising an elongated hollow cylindrical body constituted by two semi-cylindrical sections pivotally attached to each other at adjacent meeting edges, interlocking mechanism carried by the other meeting edges of the sections in locked engagement, said pivotal attachment including elongated tubular bearing members along said meeting edge, pivot pins in the passages in said bearing members and protruding outwardly of the ends thereof and plates connecting said outwardly protruding ends, said plates having holes to receive said ends, said interlocking mechanism including a pivoted recessed block carrier by the other meeting edge of one of the sections and a pivoted handle carried by the other meeting edge of the other of said sections, said handle adapted to be swung into interlocking relation with the recessed block the frictional fit of the handle in the recess of the block holding the handle against displacement.

2. A structure as defined in claim 1 wherein one of said sections carries a rubber plug for sealing a leak in a pipe.

References Cited by the Examiner

UNITED STATES PATENTS

| | | | |
|---|---|---|---|
| 887,051 | 5/1908 | Wiest | 285—197 |
| 895,143 | 8/1908 | Augensen | 285—419 X |
| 2,224,918 | 12/1940 | Merrill | 138—99 |
| 2,508,241 | 5/1950 | Ferris | 138—99 |
| 2,689,141 | 9/1954 | Kiekhoefer | 24—279 X |
| 2,703,111 | 3/1955 | Smith | 138—99 |

FOREIGN PATENTS

| | | |
|---|---|---|
| 627,451 | 3/1936 | Germany. |
| 706,899 | 4/1954 | Great Britain. |

CARL W. TOMLIN, *Primary Examiner.*

THOMAS F. CALLAGHAN, *Examiner.*